United States Patent [19]

Kuratomi et al.

[11] Patent Number: 5,793,932
[45] Date of Patent: *Aug. 11, 1998

[54] IMAGE RECOGNITION DEVICE AND AN IMAGE RECOGNITION METHOD

[75] Inventors: Yasunori Kuratomi, Suita; Hisahito Ogawa, Nara-ken, both of Japan

[73] Assignee: Matsushita Electric Industrial Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 444,723

[22] Filed: May 19, 1995

Related U.S. Application Data

[62] Division of Ser. No. 66,878, May 25, 1993, Pat. No. 5,481,621.

[30]     Foreign Application Priority Data

May 28, 1992  [JP]  Japan ..................... 4-136585

[51] Int. Cl.⁶ ..................... G06F 15/18; G06K 9/50
[52] U.S. Cl. ..................... 395/25; 706/40; 382/190; 382/206
[58] Field of Search ............... 395/25; 382/156, 382/157, 158, 212, 213, 214, 318, 204, 190, 206

[56]  References Cited

U.S. PATENT DOCUMENTS

| | | | |
|---|---|---|---|
| 3,701,095 | 10/1972 | Yamaguchi et al. | 382/156 |
| 4,310,827 | 1/1982 | Asai | 382/125 |
| 4,862,511 | 8/1989 | Peppers et al. | 382/214 |
| 4,955,060 | 9/1990 | Katsuki et al. | 382/212 |
| 5,063,602 | 11/1991 | Peppers et al. | 382/213 |
| 5,067,164 | 11/1991 | Denker et al. | 382/158 |
| 5,086,490 | 2/1992 | Peppers et al. | 382/318 |
| 5,220,644 | 6/1993 | Horan et al. | 395/25 |
| 5,263,107 | 11/1993 | Ueda et al. | 382/157 |

FOREIGN PATENT DOCUMENTS

| | | | |
|---|---|---|---|
| 0446632 | 9/1991 | European Pat. Off. | G06K 9/50 |
| 2240791 | 9/1990 | Japan | G06K 9/66 |
| 367381 | 3/1991 | Japan | G06K 9/66 |

OTHER PUBLICATIONS

Mori et al, Technical Research Reports of the Association of Electronics Communications Engineers, Mar. 26, 1988, pp. 407–414, MBE87–156, "Handwritten Kanji Character Recognition by a PDP Model".

Fukushima, Neural Networks, vol. 1, pp. 119–130, 1988, "Neocognition: A Hierarchical Neural Network Capable of Visual Pattern Recognition".

(List continued on next page.)

*Primary Examiner*—Allen R. MacDonald
*Assistant Examiner*—Sanjiv Shah
*Attorney, Agent, or Firm*—Renner, Otto, Boisselle & Sklar, P.L.L.

[57]  ABSTRACT

An image recognition device includes an input section for inputting an image; a pattern extraction section for extracting a plurality of predetermined patterns from the input image; a first feature extraction section for extracting a first feature indicating the direction in which the first pattern of the extracted predetermined patterns exists with respect to a point on a second pattern of the extracted predetermined patterns; a second feature extraction section for extracting a second feature indicating an amount of the first pattern existing in the direction with respect to the second pattern, based on the first feature; and a recognition section for recognizing the input image based on the second feature.

9 Claims, 8 Drawing Sheets

OTHER PUBLICATIONS

Akiyama et al, Japanese Journal of Applied Physics, vol. 30, No. 12B, Dec. 1991, pp. 3887–3892, "A New Optical Neuron Device for All–Optical Neural Networks".

T.A. Jamison et al, Southeastcon 89, Energy And Information Technology In The Southeast, vol. 3/3, pp. 953–958; Apr. 9, 1989, "Feature Extraction And Shape Classification of 2–D Polygons Using A Neural Network".

E.H.J. Persoon, Philips Technical Review, vol. 38, No. 11/1, 1978, pp. 356–363, "A System That Can Learn To Recognize Two–Dimensional Shapes".

T.Y. David Lam et al, Optical Computing Processing, vol. 1, No. 3, Jul. 1991, pp. 209–218, "An Optical Higher Order Double–Layer Associative Memory".

T.Y. Hou et al, SPIE vol. 1662 Image Storage and Retrieval Systems (1992), pp. 59–68, "A Content–Based Indexing Technique Using Relative Geometry Features".

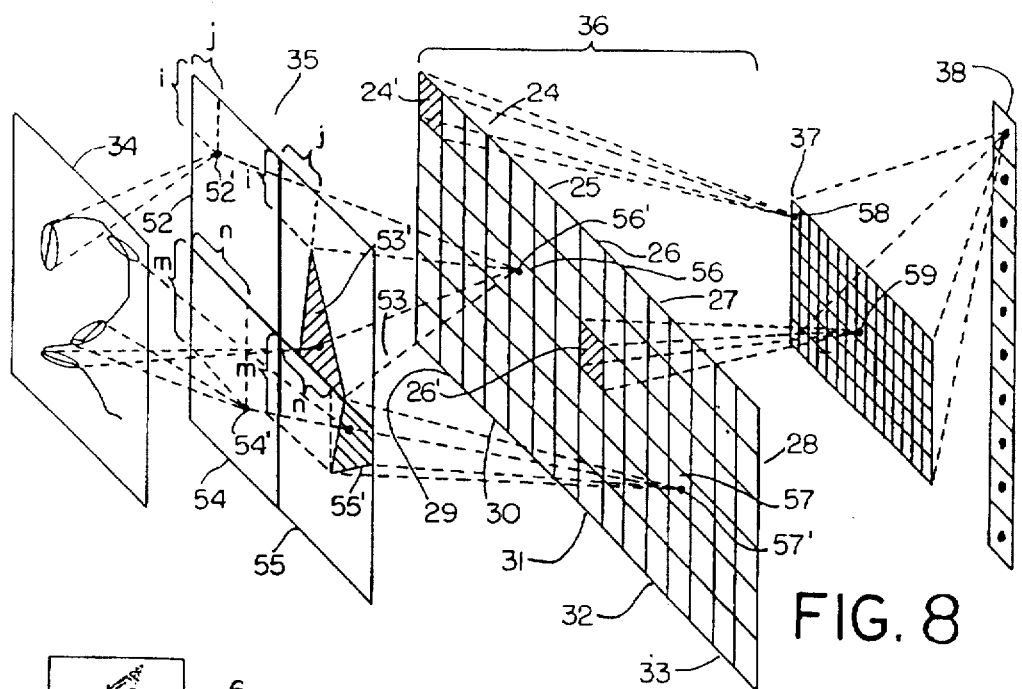
FIG. 8
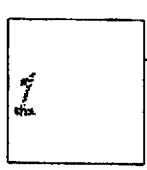
FIG. 9A
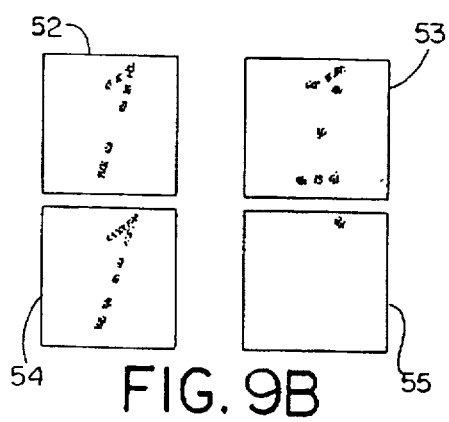
FIG. 9B
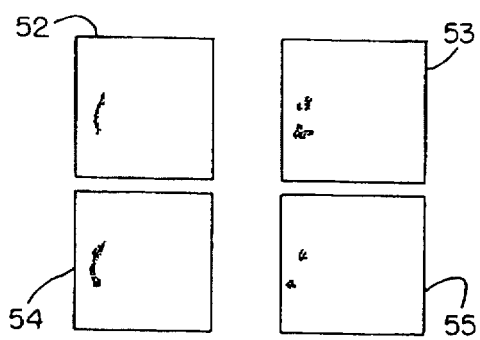
FIG. 10A
FIG. 10B
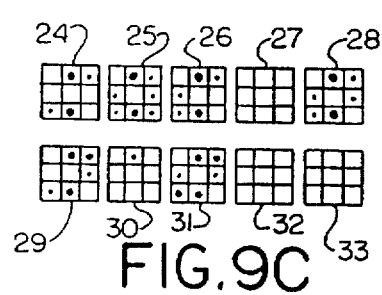
FIG. 9C
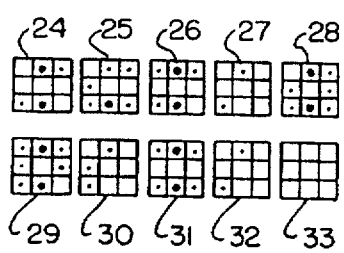
FIG. 10C

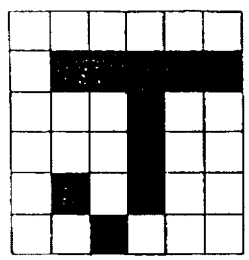
FIG. 16A
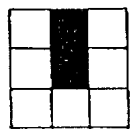
FIG. 16B
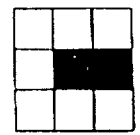
FIG. 16C
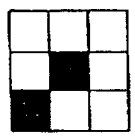
FIG. 16D
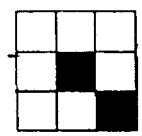
FIG. 16E
INPUT LAYER
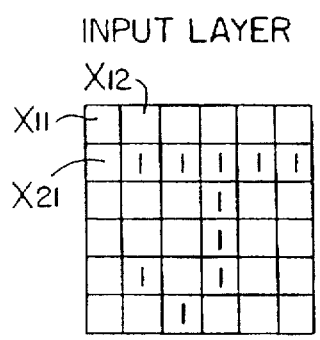
FIG. 17A
PATTERN EXTRACTION LAYER
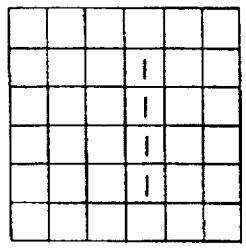
$U^1$
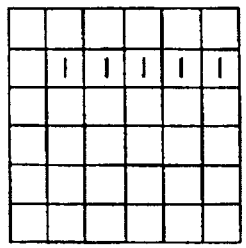
$U^2$
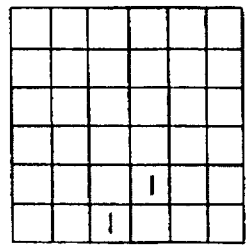
$U^3$
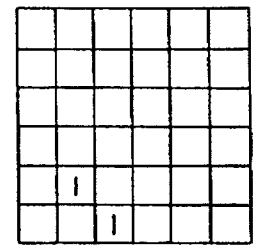
$U^4$
FIG. 17B
INTEGRATION LAYER
FIG. 17D FIG. 17C   DIRECTION EXTRACTION LAYER
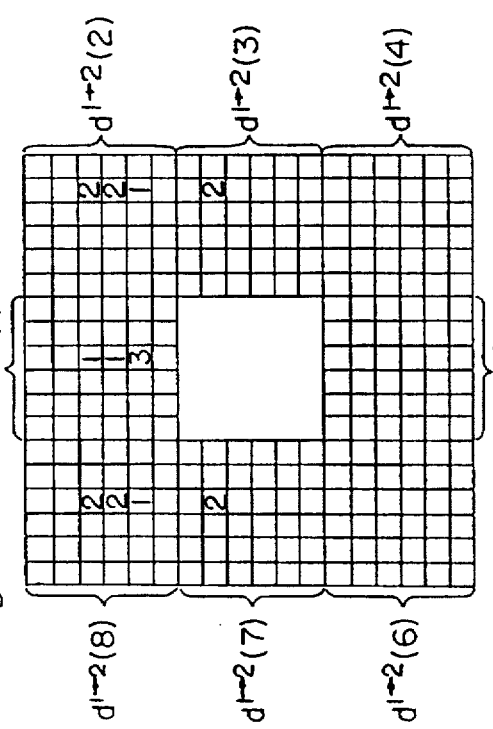
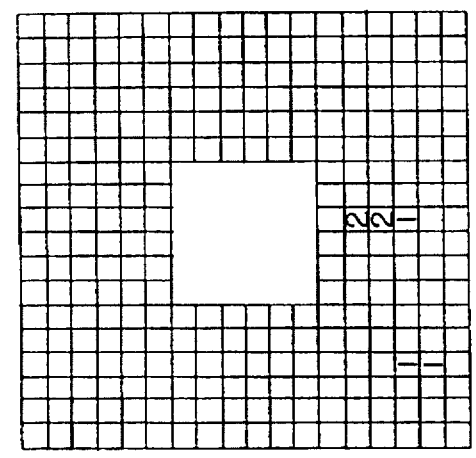
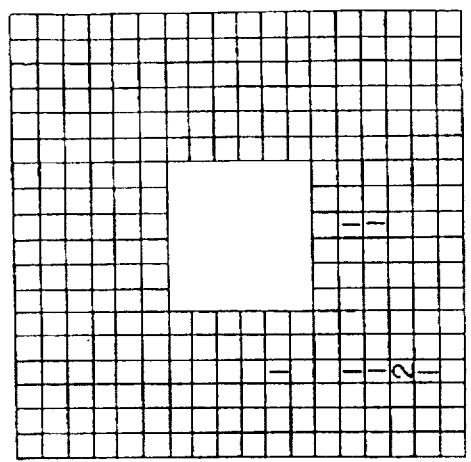
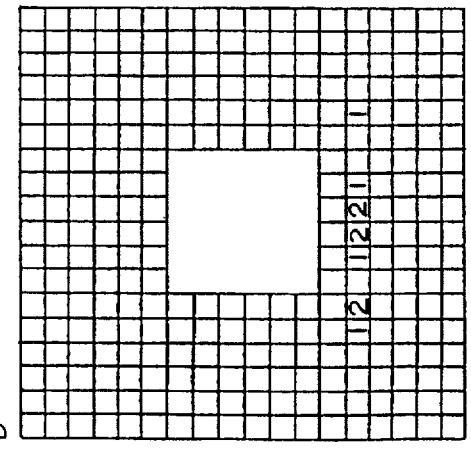
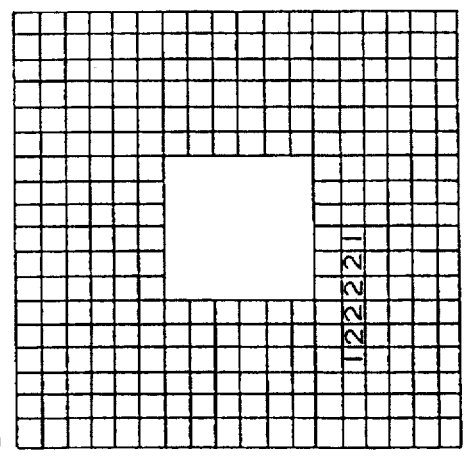
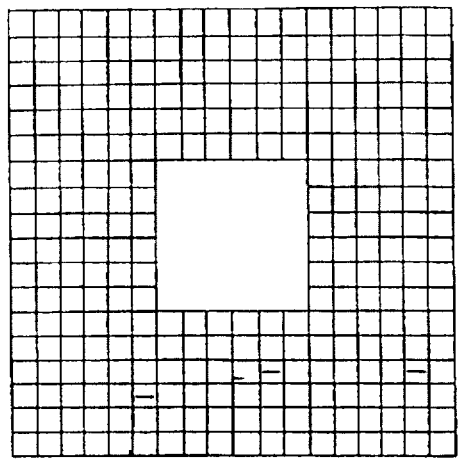

IMAGE RECOGNITION DEVICE AND AN IMAGE RECOGNITION METHOD

This is a divisional of application Ser. No. 08/066,878 filed on May 25, 1993 now U.S. Pat. No. 5,481,621.

BACKGROUND OF THE INVENTION

1. Field of the Invention

The present invention relates to an image recognition device and an image recognition method suitable for recognizing characters and other images.

2. Description of the Related Art

Recently, recognition devices using a neural network have been developed, one of the most important applications thereof being character recognition. Mori, Yokozawa, Umeda: "Handwritten KANJI character recognition by a PDP model" in Technical Research Reports of the Association of Electronic Communications Engineers, MBE87-156, pp. 407–414 (1988), and Kunihiko Fukushima: "Neocognitron: A Hierarchical Neural Network Capable of Visual Pattern Recognition", vol. 1, pp. 119–130, Neural Networks (1988), which are incorporated herein by reference.

FIG. 12 shows a block diagram of a conventional character recognition device that uses a neural network. A character input section 60 photoelectrically converts an image pattern of a character into character data, and then outputs the character data to a recognition section 61. The character data is a two-dimensional bit image as is shown in FIG. 13. The recognition section 61 processes the character data by a neural network to recognize the character. The recognition section 61 then outputs the recognition result to a memory section 62 or to a display section 63.

The operation of the neural network used by the recognition section 61 will be described with reference to FIG. 14. The character data 64 generated by the character input section 60 is input to corresponding neurons 66 of an input layer 65. The character data 64 received by the neurons 66 is sent to all neurons 69 in an hidden layer 68 through pathways 67 referred to as synapses. It is important to note that the character data 64 is weighted before being input to the neurons 69. The weighting value is referred to as "synapse weight". The neurons 69 in the hidden layer 68 calculate the sum of all input data, and output the result which is obtained by applying a non-linear function to the sum. These output results are input to all neurons 72 in an output layer 71 through the synapses 70 after being weighted with the synapse weights. The neurons 72 in the output layer 71 calculate the sum of all input data, and output the result to a maximum value detection section 73. The maximum value detection section 73 obtains the maximum value of all the data sent from the neurons 72 in the output layer 71, and outputs the character corresponding to the neuron that outputs the maximum value as the recognition result to either the memory section 62 or to the display section 63.

The synapse weights used in the above process are determined by learning referred to as error back propagation. For example, in the case when alphabets are to be recognized, alphabets are sequentially input into the neural network, and the learning is continued until a desired output result is obtained, thereby determining the synapse weight. The neural network is trained in several different styles and fonts of characters to further improve the recognition rate.

Obtaining the feature of an image is referred to as feature extraction. In recognizing an input character, the conventional character recognition device extracts a feature from the input character in the character input section 60. Then, the device inputs the feature into the neural network of the recognition section 61 as an input signal so as to recognize the input character. The recognition ability depends on what kind of features are extracted from the input character by the character input section 60.

The conventional character recognition device simply uses a mesh feature of the character data generated by the character input section 60. Namely, the device recognizes an input character based on a binary bit image or a density value normalized in the range of 0 to 1. The binary bit image is generated from a density value by use of a certain threshold level. In short, the recognition is performed based on which parts of the character data are black and which parts of the character data are white. Accordingly, characters which are different in shape or positionally displaced from the characters beforehand learned by the neural network cannot be correctly recognized. In order to improve the recognition rate, the neural network is required to learn about several tens of different styles and fonts of the characters. However, the recognition rate is still approximately 90% even when the application is limited to the recognition of printed figures, and the learning is significantly time-consuming.

Especially, it is much more difficult to recognize characters having different sizes from the characters learned by the neural network. In order to overcome such a difficulty, the conventional character recognition device calculates the center of gravity of an input character, and makes the character data by normalizing the size of the input character. However, since such a normalization process is extremely time-consuming, high speed recognition is impossible.

There are similar problems in the recognition of two-dimensional images other than characters.

SUMMARY OF THE INVENTION

An image recognition device according to the present invention includes an input section for inputting an image, a feature extraction section for extracting a feature of the input image, and a recognition section for recognizing the input image based on the extracted feature. The feature extraction section includes a pattern extraction section for extracting a line segment with a certain direction or a certain geometric pattern (referred to as a specific pattern, hereinafter) from the input image, and further includes a direction extraction section for extracting existing direction of the second pattern with respect to the first pattern and the amount of the second pattern existing in that direction.

Alternatively, an image recognition device according to the present invention includes an input section for inputting an image; a pattern extraction section for extracting a plurality of predetermined patterns from the input image; a first feature extraction section for extracting a first feature indicating the direction in which a first pattern of the extracted predetermined patterns exists with respect to the point on a second pattern of the extracted predetermined patterns; a second feature extraction section for extracting a second feature indicating the amount of the first pattern existing in the direction with respect to the second pattern, based on the first feature; and a recognition section for recognizing the input image based on the second feature.

In another aspect of the present invention, an image recognition method according to the present invention includes the steps of inputting an image; extracting a plurality of predetermined patterns from the input image; extracting a first feature indicating the direction in which the first pattern of the extracted predetermined patterns exists with respect to the point on a second pattern of the extracted predetermined patterns; extracting a second feature indicating the amount of the first pattern existing in the direction with respect to the second pattern, based on the first feature; and recognizing the input image based on the second feature.

In another aspect of the present invention, a device for extracting a feature of an input image according to the present invention includes a first display element for displaying the first pattern of the input image; a second display element for displaying the pattern representing a plurality of points existing in the direction with regard to a point on the first pattern displayed on the first display means; a third display element for displaying a pattern obtained by multi-imaging second patterns of the input image; an overlapping element for overlapping the patterns displayed on the first, second and third display elements; and a detecting element for detecting the overlapped pattern.

An operation of an image recognition device according to the present invention will be described, using character recognition as an example for simplicity.

In order to improve the recognition rate of the image recognition device, we have found out a new feature which is not influenced by deformation of the character to be recognized. Characters having different sizes can be correctly recognized by extracting the feature which not influenced by the changing in size nor by shift in position of the character. According to the present invention, a feature extraction section extracts the following feature from character data generated by an input section.

(1) Data indicating whether a specific pattern (e.g., a vertical, horizontal, left-oblique, or right-oblique line segment, or a geometric pattern) exists or not.

(2) Data indicating in which direction and in what amount a specific pattern exists with respect to another specific pattern.

In other words, a character is recognized based on the data indicating in which direction and in what amount a specific pattern exists with respect to another specific pattern constituting the character.

A relative positional relationship between line segments and geometric patterns which constitute the character does not substantially vary, even if the sizes thereof are different from each other. Accordingly, the above-mentioned features extracted by the feature extraction section according to the present invention are not influenced by the changing in size nor by shift in the position of the characters.

As has been described, a neural network according to the present invention extracts a feature having a high level of tolerance for various variations of a character. Therefore, even hand-written characters having different sizes are recognized at a high rate. Further, since only a small number of styles and fonts of characters are required to be learned, the learning process is finished at a high speed. The above-described operations have the same effects for the recognition of two-dimensional images other than characters.

Thus, the invention described herein makes possible the advantage of providing an image recognition device and an image recognition method using a neural network having a high recognition rate.

This and other advantages of the present invention will become apparent to those skilled in the art upon reading and understanding the following detailed description with reference to the accompanying figures.

BRIEF DESCRIPTION OF THE DRAWINGS

FIG. 8 is a view illustrating a configuration of a neural network used according to an example of the present invention.

FIG. 9A is a schematic view illustrating an example of a bit image generated by the input section.

FIG. 9B is a schematic view of outputs obtained from the image shown in FIG. 9A by a line segment extraction section.

FIG. 9C is a schematic view of outputs obtained from the image shown in FIG. 9A by the direction extraction section.

FIG. 10A is a schematic view illustrating an example of a bit image generated by the input section.

FIG. 10B is a schematic view of outputs obtained from the image shown in FIG. 10A by the line segment extraction section.

FIG. 10C is a schematic view of outputs obtained from the image shown in FIG. 10A by the direction extraction section.

FIG. 16A is a view illustrating an example of a binary pattern converted from an input pattern.

FIG. 16B is a view illustrating an example of a mask pattern for extracting a vertical line segment.

FIG. 16C is a view illustrating an example of a mask pattern for extracting a horizontal line segment.

FIG. 16D is a view illustrating an example of a mask pattern for extracting a left-oblique line segment.

FIG. 16E is a view illustrating an example of a mask pattern for extracting a right-oblique line segment.

FIG. 17A is a view illustrating an example of an output from an input layer.

FIG. 17B is a view illustrating an example of outputs from a pattern extraction layer.

FIG. 17C is a view illustrating an example of outputs from a direction extraction layer.

FIG. 17D is a view illustrating an example of outputs from a integration layer.

DESCRIPTION OF THE PREFERRED EMBODIMENTS

Hereinafter, the present invention will be described with reference to figures.

EXAMPLE 1

Figure 1:
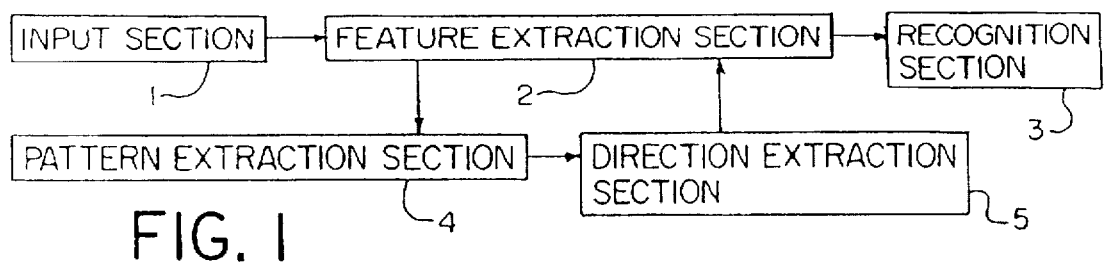
FIG. 1 is a block diagram showing a configuration of an image recognition device according to the present invention.

FIG. 1 shows a configuration of an image recognition device according to a first example of the present invention. The image recognition device includes an input section 1, a feature extraction section 2, and a recognition section 3. The input section 1 generates a two-dimensional bit image from an input image and then sends data concerning the image to the feature extraction section 2. A pattern extraction section 4 extracts various specific patterns from the bit image. A direction extraction section 5 extracts data representing a relative positional relationship between various specific patterns and then sends the data to the recognition section 3. The recognition section 3 recognizes the image based on the input data.

Figure 2A:
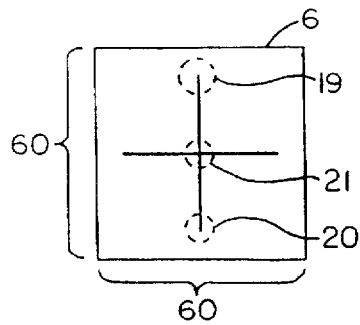
FIG. 2A is a schematic view illustrating an example of a bit image generated by an input section.
Figure 2B:
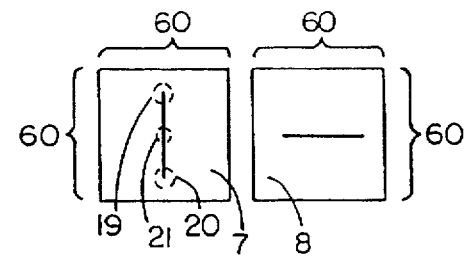
FIG. 2B is a schematic view of line segments extracted from the image shown in FIG. 2A.
Figure 2C:
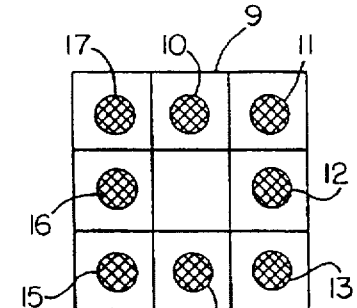
FIG. 2C is a schematic view of an output obtained from the image shown in FIG. 2A by a direction extraction section.

FIGS. 2A, 2B, and 2C show practical examples of the output from the feature extraction section 2. FIG. 2A shows a bit image 6 generated by the input section 1. The white portions correspond to "0", and the black portions correspond to "1". The bit image 6 is represented by a matrix having, for example, 60×60 elements. FIG. 2B shows outputs from the pattern extraction section 4. The outputs include, for example, an extraction result 7 of a vertical line segment and an extraction result 8 of a horizontal line segment. Each output is a two-dimensional bit image. FIG. 2C shows an output 9 from the direction extraction section 5. The direction extraction section 5 detects, for example, direction in which the horizontal line segment exists with respect to the vertical line segment. The direction is selected from eight directions obtained by equally dividing 360°, the eight directions being indicated by regions 10 through 17 as shown in FIG. 2C. The diameter of black circles indicate the length of the horizontal line segment existing in each direction. For example, the output in the region 10 indicates that a horizontal line segment having a length corresponding to the diameter of the black circle exists on a top portion of a vertical line segment. The output of the region 12 indicates that a horizontal line segment having a length corresponding to the diameter of the black circle exists on the middle right portion of the vertical line segment.

The meaning of the output 9 from the direction extraction section 5 will be described in detail with reference to FIG. 3. A square in FIG. 3 indicates the bit image 6. A circle covering the entire bit image 6 is drawn around a bit 18' on which a vertical line segment exists. The circle is equally divided into eight using the bit 18' as a reference point, thereby defining eight directions 10' through 17'. When the bit 18' on the vertical line segment is considered as a reference point, the horizontal line segment exists in the directions 13' through 15'. As a result, the regions 13 through 15 shown in FIG. 2C output the output signals. The output shown in FIG. 2C is generated with all points on the vertical line segment as reference points.

In the case where the top portion 19 of the vertical line segment "1" constituting a pattern "+" shown in FIG. 2A is considered as a reference point, the horizontal line segment exists in the directions 13' through 15'. In the case where the bottom portion 20 of the vertical line segment shown in FIG. 2A is considered as a reference point, the horizontal line segment exists in the directions 17', 10' and 11'. In the case where the middle portion 21 of the vertical line segment shown in FIG. 2A is considered as a reference point, the horizontal line segment exists in the directions 12' and 16'. Accordingly, the output from the direction extraction section 5 is as shown in FIG. 2C.

Figure 4A:
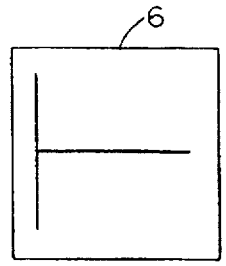
FIG. 4A is a schematic view illustrating an example of a bit image generated by the input section.
Figure 4B:
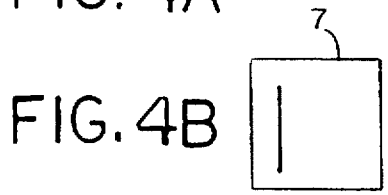
FIG. 4B is a schematic view of line segments extracted from the image shown in FIG. 4A.
Figure 5A:
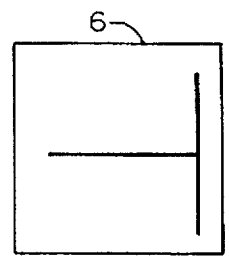
FIG. 5A is a schematic view illustrating an example of a bit image generated by the input section.
Figure 4C:
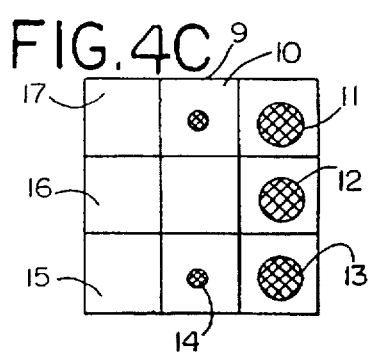
FIG. 4C is a schematic view of an output obtained from the image shown in FIG. 4A by the direction extraction section.
Figure 5B:
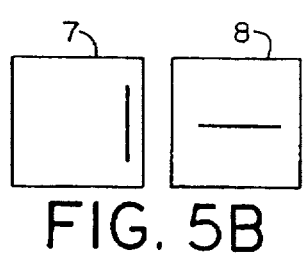
FIG. 5B is a schematic view of line segments extracted from the image shown in FIG. 5A.
Figure 5C:
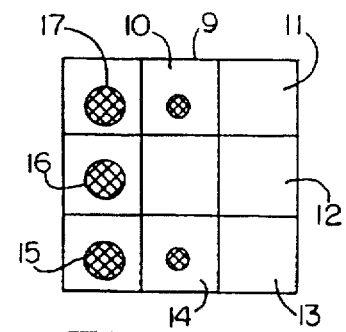
FIG. 5C is a schematic view of an output obtained from the image shown in FIG. 5A by the direction extraction section.

FIGS. 4A through 4C show outputs for a pattern constituted by a vertical line segment and a horizontal line segment. FIGS. 5A through 5C show outputs for another pattern constituted by a vertical line segment and a horizontal line segment. FIGS. 4A and 5A show input bit images. FIGS. 4B and 5B show extraction results of the vertical and the horizontal line segments, and FIGS. 4C and 5C show outputs from the direction extraction section 5. For the input bit image shown in FIG. 4A, regions 10 through 14 output as shown in FIG. 4C. For the input bit image shown in FIG. 5A, regions 10 and 14 through 17 output as shown in FIG. 5C. Thus, the output 9 from the direction extraction section 5 indicates the positional relationship between the vertical and the horizontal line segments. Such a feature of the output 9 always changes when the positional relationship between the vertical and the horizontal line segments changes.

Figure 6A:
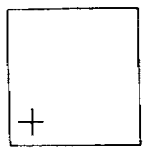
FIG. 6A is a view illustrating bit images generated by the input section.
Figure 6A:
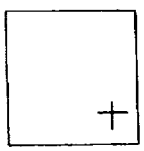
Figure 6A:
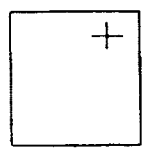
Figure 6B:
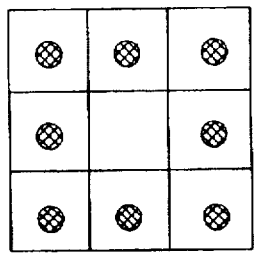
FIG. 6B is a view of an output obtained from the bit images by the direction extraction section.

The output 9 has a remarkable feature of not being dependent on the size or the position of the pattern. FIG. 6A shows bit images of four patterns "+" having different sizes and positions, and FIG. 6B shows the output from the direction extraction section 5 for the bit images. As is shown in FIG. 6B, the strength in each region of the output (indicated by a diameter of each black circle) is smaller than that in FIG. 2C, but the output arrangement completely corresponds with that in FIG. 2C.

As has been described so far, the feature extraction section 2 of the image recognition device according to the first example of the present invention extracts features which are not influenced by the size nor by the position of the pattern. Since the recognition section 3 recognizes such features, a significantly high recognition rate is realized.

Hereinafter, an example of configuration of an image recognition device according to the present invention will be described with reference to FIG. 7.

A recognition device includes an input section 1, a feature extraction section 2, and a recognition section 3. The feature extraction section 2 includes a first neural network 4' acting as a pattern extraction section 4 and a second neural network 5' acting as a direction extraction section 5. The recognition section 3 includes a third neural network. An input character is converted into a two-dimensional bit image by the input section 1. The bit image is sent to an input layer 34 of the first neural network 4'. A pattern extraction layer 35 of the first neural network 4' includes a vertical line segment extraction layer 35' and a horizontal line segment extraction layer 35". The vertical line segment extraction layer 35' and the horizontal line segment extraction layer 35" each have neurons in an identical number of that of neurons in the input layer 34, the neurons being arranged two-dimensionally. The vertical line segment extraction layer 35' extracts a vertical line segment, and the horizontal line segment extraction layer 35" extracts a horizontal line segment.

A principle of line segment extraction will be described briefly, using the vertical line segment extraction as an example.

The input layer 34 and the vertical line segment extraction layer 35' in the first neural network 4' have an identical number of neurons with each other arranged two-dimensionally. The output from a neuron disposed at the i-th row from the top and the j-th column from the left (i.e., at a position (i, j), hereinafter) in the input layer 34 is denoted as $x^1_{i,j}$. The output from a neuron disposed at the position (i, j) in the vertical line segment extraction layer 35' is denoted as $x^2_{i,j}$. Here, it is assumed that the neurons in the vertical line segment extraction layer 35' are each connected to the corresponding neuron in the input layer 34 (namely, disposed at the same coordinate of the input layer 34) and its vertically adjacent neurons (Setting 1). Accordingly, when the output function of the neurons in the vertical line segment extraction layer 35' is f, $x^2_{i,j}$ is expressed by Equation 1 (Setting 2).

$$x^2_{i,j}=f(wx^1_{i-1,j}+2wx^1_{i,j}+wx^1_{i+1,j}) \quad \text{Equation 1}$$

where w and 2w(w>0) are the synapse weights. The output function f is as expressed by Equation 2 (Setting 3).

$$\begin{aligned} y &= f(x) \\ y &= 0 (0 \leq x < 3w) \\ y &= x - 2w (3w \leq x) \end{aligned} \quad \text{Equation 2}$$

In the case where a vertical line segment exists in the input image, for example, $x^1_{i-1,j}=x^1_{i,j}=x^1_{i+1,j}=1$. The neurons vertically arranged in the input layer 34 output the output signals.

Based on the above three settings, the neurons in the vertical line segment extraction layer 35' output the output signals only when the corresponding neurons in the input layer 34 constitute a vertical line segment. Thus, a vertical line segment is extracted.

Extraction of a horizontal line segment and an oblique line segment are performed by the same principle. Assuming that the neurons in the horizontal line segment extraction layer 35" are each connected to the corresponding neuron in the input layer 34 and its horizontally adjacent neurons, a horizontal line segment is extracted. The output from the neuron in the horizontal line segment extraction layer 35" is expressed by Equation 3, where $x^3_{i,j}$ denotes an output from a neuron disposed at a position (i, j) in the horizontal line segment extraction layer 35".

$$x^3_{i,j}=f(wx^1_{i,j-1}+2wx^1_{i,j}+wx^1_{i,j+1}) \quad \text{Equation 3}$$

For extracting a left-oblique line segment and a right-oblique line segment, the connection is expressed by Equations 4 and 5, respectively, where $x^4_{i,j}$ denotes an output from a neuron disposed at a position (i, j) in the left-oblique line segment extraction layer (not shown), and $x^5_{i,j}$ denotes an output from a neuron disposed at a position (i, j) in the right-oblique line segment extraction layer (not shown).

$$x^4_{i,j}=f(wx^1_{i-1,j+1}+2wx^1_{i,j}+wx^1_{i+1,j-1}) \quad \text{Equation 4}$$

$$x^5_{i,j}=f(wx^1_{i-1,j-1}+2wx^1_{i,j}+wx^1_{i+1,j+1}) \quad \text{Equation 5}$$

Line segments in four directions are simultaneously extracted by preparing four regions as the pattern extraction layer 35, each region including the same number of neurons as the input layer 34 and by allocating one line segment in each region.

A specific geometrical pattern can be extracted in a same manner. For example, the pattern "Λ" is extracted by the connection expressed by Equation 6, where $x^6_{i,j}$ denotes an output from a neuron disposed at a position (i, j) in the geometrical pattern extraction layer (not shown).

$$x^6_{i,j}=f(wx^1_{i+1,j-1}/2+2wx^1_{i,j}+wx^1_{i+1,j-1}/2) \quad \text{Equation 6}$$

Patterns of "+", "⊤", "⊥" and the like are extracted in the same manner.

The output from the pattern extraction layer 35 is an input to the second neural network 5' constituting the direction extraction section 5. The second neural network 5' includes a direction extraction layer 36 and an integration layer 37. The direction extraction layer 36 has the function of detecting direction in which a horizontal line segment exists with respect to a vertical line segment, and includes eight regions 39 through 46 corresponding to the eight directions, respectively. Note that the hatched region at the center has no neurons. Each of the regions 39 through 46 has an identical matrix size with that of the input layer 34. In FIG. 7, the matrix size is 3×3 neurons for simplicity. For example, the region 39 detects whether a horizontal line segment exists in the top left direction (i.e., the direction 17" in FIG. 3) with respect to a vertical line segment. A neuron 39' in the region 39 is connected to a neuron 47 at a position corresponding thereto in the vertical line segment extraction layer 35' and a neuron 48 disposed in the direction of 17' in the horizontal line segment extraction layer 35" with respect to the neuron 47.

The reason why the neuron 48 exists in the direction 17' with respect to the neuron 47 will be described. The neuron 47 fires when a vertical line segment exists at a position of a neuron 49 in the input layer 34, and the neuron 48 fires when a horizontal line segment exists at a position of a neuron 50 in the input layer 34. With respect to the vertical line segment existing at the position of the neuron 49 in the input layer 34, the horizontal line segment existing at the position of the neuron 50 exists in the direction 17'. Accordingly, with respect to the vertical line segment extracted by the neuron 47, the horizontal line segment extracted by the neuron 48 exists in the direction 17'.

A neuron 39' fires only when the neurons 47 and 48 fire, namely, when the neuron 49 is a part of a vertical line segment and further a horizontal line segment exists in the direction 17' with respect to the vertical line segment.

In the same manner, a neuron 39" is connected to a neuron 47' at the corresponding position in the vertical line segment extraction layer 35' and the neurons 48 and 48' existing in the direction 17' with respect to the neuron 47' in the horizontal line segment extraction section 35". The neuron 39" fires only when at least one of the neurons 48 and 48' fires and further the neuron 47' fires.

By the same type of connection, neurons in the other regions 40 through 46 extract directions in which a horizontal line segment exists with respect to a vertical line segment. For example, a neuron in the region 44 extracts data representing a feature that a horizontal line segment exists in the direction 14' (the "below" direction, see FIG. 3) with respect to a vertical line segment. A neuron 44' in the region 44 is connected to the neuron 47 at a corresponding position in the vertical line segment extraction layer 35' and the neuron 48" existing in the direction 14' with respect to the neuron 47 in the horizontal line segment extraction layer 35". The neuron 44' fires only when the neurons 47 and 48" simultaneously fire. By such a connection, the region in which a horizontal line segment positionally related to a vertical line segment is extracted.

Figure 7:
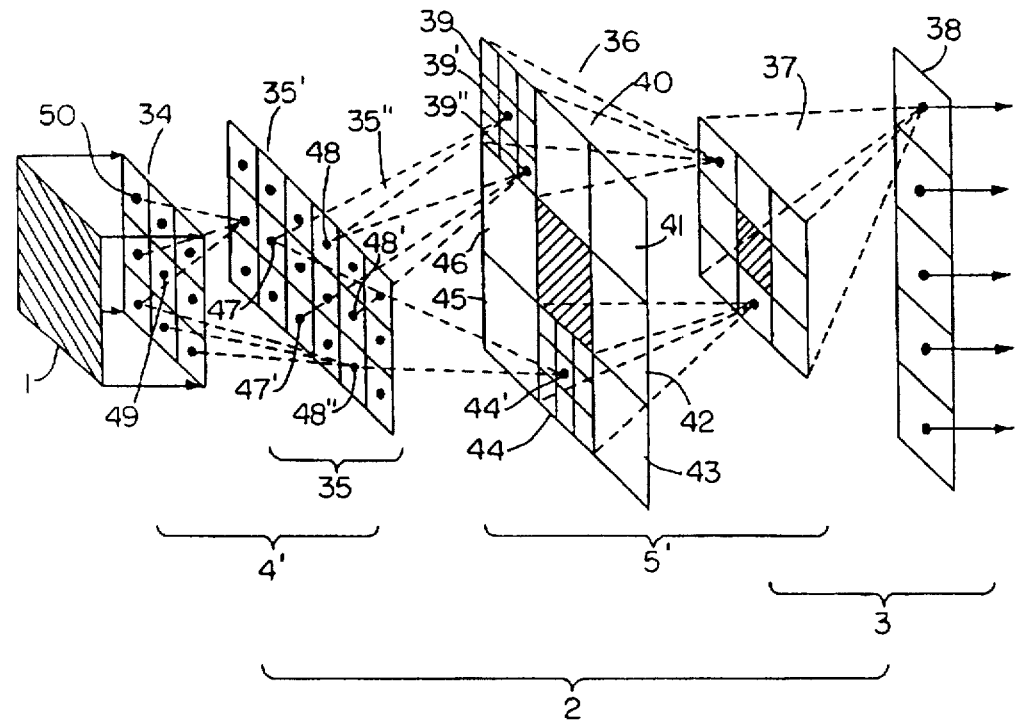
FIG. 7 is a view illustrating a configuration of a neural network according to an example of the present invention.

As is shown in FIG. 7, the integration layer 37 locally integrates the output from the direction extraction layer 36. The integration layer 37 has eight neurons. In FIG. 7, only 3×3 neurons are shown for simplicity, but the hatched region is not a neuron. The eight neurons apply the same synapse weight (e.g., 1) to the output from the regions 39 through 46 corresponding thereto in the direction extraction layer 36 and generates an integrated output by each neuron. Further, these eight neurons calculate the sum of all input signals, and output the result which is obtained by applying a linear function to the sum. The outputs thus obtained are shown in FIGS. 2C, 4C and 5C.

The recognition section 3 includes the third neural network, which includes the integration layer 37 and an output layer 38. Neurons in the output layer 38 are each connected to all of the neurons in the integration layer 37. Each neuron in the output layer 38 obtains the sum of the input signals weighted with synapse weights, and only the neuron having the maximum sum output the output signal. This is a technique called "a detection of the maximum value".

In the first example, neurons are provided in a small number for simply describing the basic operation. Various other operations for recognition can be performed by using neurons in a larger number and specifying a larger number of patterns to be extracted. Although the recognition section 3 includes only the integration layer 37 and the output layer 38 in the first example, three or more layers may be included.

EXAMPLE 2

In a second example of the present invention, a image recognition device and method suitable for recognizing a hand-written character will be described below.

FIG. 8 shows a configuration of a neural network constituting a feature extraction section and a recognition section of an image recognition device according to the second example of the present invention. The neural network includes an input layer 34, a pattern extraction layer 35, a direction extraction layer 36, an integration layer 37 and an output layer 38. The basic operation is identical as that of the neural network shown in FIG. 7. The input layer 34 is represented by a matrix having, for example, 60×60 neurons. The pattern extraction layer 35 includes a vertical line segment extraction layer 52, a horizontal line segment extraction layer 53, a left-oblique line segment extraction layer 54, and a right-oblique line segment extraction layer 55. The layers 52 through 55 each have the same number of neurons as in the input layer 34 arranged two-dimensionally. Based on the principle described in the first example, line segments in the four directions are separately extracted in each of the layers 52 through 55. The direction extraction layer 36 detects the positional relationship among the line segments extracted by the layers 52 through 55. Specifically, a region 24 detects the positional relationship between a vertical line segment and another vertical line segment. A region 25 detects the positional relationship between a vertical line segment and a horizontal line segment. A region 26 detects the positional relationship between a vertical line segment and a left-oblique line segment. A region 27 detects the positional relationship between a vertical line segment and a right-oblique line segment. A region 28 detects the positional relationship between a horizontal line segment and another horizontal line segment. A region 29 detects the positional relationship between a horizontal line segment and a left-oblique line segment. A region 30 detects the positional relationship between a horizontal line segment and a right-oblique line segment. A region 31 detects the positional relationship between a left-oblique line segment and another left-oblique line segment. A region 32 detects the positional relationship between a left-oblique line segment and a right-oblique line segment. A region 33 detects the positional relationship between a right-oblique line segment and another right-oblique line segment. The regions 24 through 33 are each divided into eight sub regions. In FIG. 8, each region has 3×3 sub regions, but the region on the second row and the second column has no neuron. Each sub region is represented by a matrix having 60×60 neurons. When a specific positional relationship that a line segment 1 exists in a certain direction with respect to another line segment 2 is satisfied, each neuron outputs data representing a length of the line segment 1 under the relationship.

For example, a neuron in a sub region 56 in the region 25 fires when a horizontal line segment exists in the direction 14' (the "below" direction, see FIG. 3) with respect to a vertical line segment. In the same manner, a neuron in a sub region 57 in the region 32 fires when a right-oblique line segment exists in the direction 11' (the "right above" direction, see FIG. 3) with respect to a left-oblique line segment.

In order to implement the above-mentioned functions, a neuron 56' at the position (i, j) of the sub region 56 is connected to the following two types of neurons in the pattern extraction layer 35 (Setting 1).

(1) A neuron 52' disposed at a position (i, j) in the vertical line segment extraction layer 52.

(2) A group of neurons 53' existing in the direction 14' (the "below" direction, see FIG. 3) with respect to the neuron disposed at a position (i, j) in the horizontal line segment extraction layer 53. The group of neurons 53' is represented by the hatched region in FIG. 8.

In this case, the neuron 56' fires only when the neuron 52' fires (this means that the vertical line segment exists at a position (i, j)) and further at least one of the neurons 53' fires (this means that the horizontal line segment exists in the direction 14' with respect to the neuron disposed at a position (i, j)). The strength of the output is in proportion to the number of neurons activated among the neurons 53' (length of the horizontal line segment) (Setting 2). Due to Settings 1 and 2, the neuron 56' in the sub region 56 extracts the length of the horizontal line segment existing in the direction 14' with respect to the vertical line segment disposed at a position (i, j) in the input pattern.

In the same manner, a neuron 57' disposed at a position at the m-th row and the n-th column in a sub region 57 (matrix size 60×60) in the region 32 is connected to the following two types of neurons (Setting 1').

(1) A neuron 54' disposed at a position (m, n) in the left-oblique line segment extraction layer 54 (matrix size 60×60).

(2) A group of neurons 55' existing in the direction 11' with respect to the neuron disposed at a position (m, n) in the right-oblique segment extraction layer 55 (matrix size 60×60). The group of neurons 55' is represented by the hatched region in FIG. 8.

In this case, the neuron 57' fires only when the neuron 54' fires (this means that a left-oblique line segment exists at a position (m, n)) and further at least one of the neurons 55' fires (this means that the right-oblique segment exists in the direction 11' with respect to the neuron disposed at a position (m, n)). The strength of the output is in proportion to the number of neurons firing among the neurons 55' (length of the left-oblique line segment) (Setting 2'). Due to Settings 1' and 2', the neuron 57' in the sub region 57 extracts the length of the left-oblique line segment existing in the direction 11' with respect to the vertical line segment disposed at a position (m, n) in the input pattern.

Neurons in the integration layer 37 each integrates the output from the sub region corresponding thereto in the direction extraction layer 36. A neuron 58 in the integration layer 37 is connected to all the neurons in the sub region 24' (which extracts a length of a vertical line segment existing in the direction 17' with respect to another vertical line segment) in the region 24 in the direction extraction layer 36 with, for example, a synapse weight 1 (Setting 3), thereby outputting a value in proportion to the sum of the input signals (Setting 4). As a result, the output from the neuron 58 corresponds to the sum of the lengths of the vertical line segments existing in the direction 17' with respect to another vertical line segment in the entire input pattern.

In the same manner, for example, a neuron 59 in the integration layer 37 is connected to all the neurons in the sub region 26' (matrix size 60×60: which extracts a length of a left-oblique line segment existing in the direction 14' with respect to a vertical line segment) in the region 26 in the direction extraction layer 36. As a result, the neuron 59 extracts the sum of the lengths of the left-oblique line segments existing in the direction 14' with respect to a vertical line segment in the entire input pattern.

Due to Settings 3 and 4, the output from the integration layer 37 (matrix size 8×10) indicates the positional relationship among the line segments. As is described in detail in the first example, the output from the integration layer 37 does not depend on the position and size of the specific patterns in the input image, although the absolute value of the output data depends on the size. Neurons in the output layer 38 are each connected to all the neurons in the integration layer 37, and only the neuron having the maximum sum of the input signals outputs the output signal. The character corresponding to the output signal is the recognition result.

FIGS. 9A through 9C and 10A through 10C through 10C show output from each neuron for a figure "1". FIGS. 9A and 10A show bit images (matrix size 60×60), FIGS. 9B and 10B show outputs from the pattern extraction layer 35, and FIG. 9C and 10C show outputs from the integration layer 37. Reference numerals 52 through 55 of FIGS. 9B and 10B indicate the extraction results of a vertical line segment, a horizontal line segment, a left-oblique line segment and a right-oblique line segment, respectively. Reference numerals 24 through 33 of FIGS. 9C and 10C indicate the positional relationship among the line segments. Specifically, the reference numeral 24 indicates the relationship between a vertical line segment and another vertical line segment. The reference numeral 25 indicates the relationship between a vertical line segment and a horizontal line segment. The reference numeral 26 indicates the relationship between a vertical line segment and a left-oblique line segment. The reference numeral 27 indicates the relationship between a vertical line segment and a right-oblique line segment. The reference numeral 28 indicates the relationship between a horizontal line segment and another horizontal line segment. The reference numeral 29 indicates the relationship between a horizontal line segment and a left-oblique line segment. The reference numeral 30 indicates the relationship between a horizontal line segment and a right-oblique line segment. The reference numeral 31 indicates the relationship between a left-oblique line segment and another left-oblique line segment. The reference numeral 32 indicates the relationship between a left-oblique line segment and a right-oblique line segment. The Reference numeral 33 indicates the relationship between a right-oblique line segment and another right-oblique line segment.

The outputs from the integration layer 37 shown in FIGS. 9C and 10C are directed to handwritten figures "1" having different sizes and positions, but are extremely similar to one another. As is apparent from this, image recognition which is not influenced by the difference in the size nor by position can be realized.

Figure 11A:
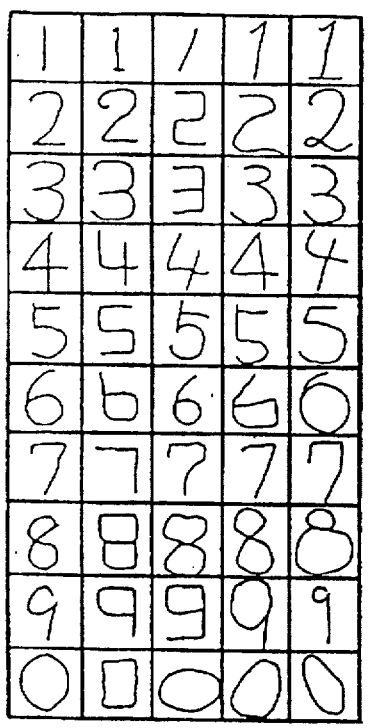
FIG. 11A is a schematic view illustrating characters learned by a recognition section according to an example of the present invention.
Figure 11B:
FIG. 11B is a schematic view illustrating characters correctly recognized by the recognition section.
Figure 13:
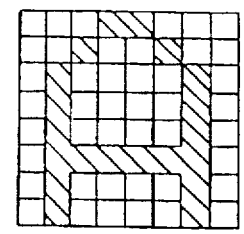
FIG. 13 is a schematic view of a bit image.
Figure 12:
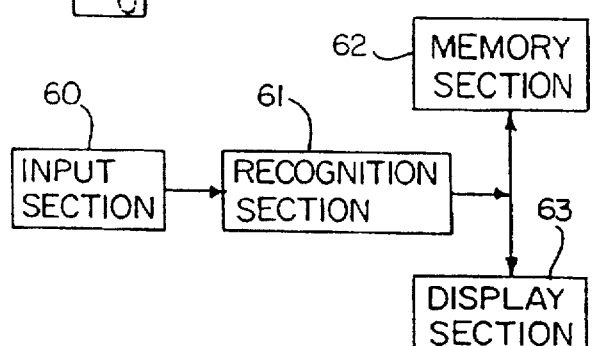
FIG. 12 is a block diagram illustrating a configuration of a conventional recognition device.

It is sufficient to perform the learning process for determining synapse weights between the integration layer 37 and the output layer 38. In the second example, ten figures of five different types shown in FIG. 11A were learned by the neural network by use of the orthogonal learning method. After the learning, figures which were not learned, as shown in FIG. 11B, were input into the image recognition device. We have found that all of the figures were correctly recognized.

An image recognition method according to the present invention will be described, hereinafter.

Figure 15:
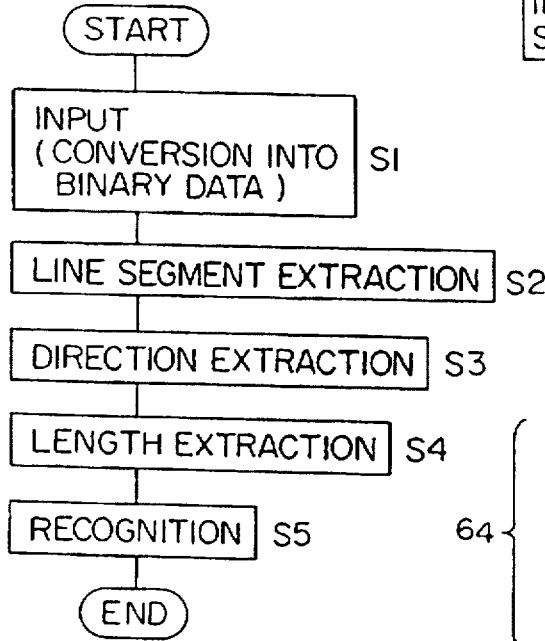
FIG. 15 is a flowchart illustrating a procedure of an image recognition method according to the present invention.
Figure 14:
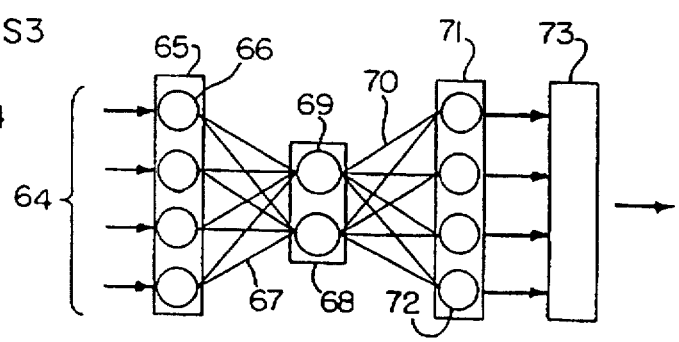
FIG. 14 is a view illustrating a configuration of a neural network used in the conventional recognition device.

FIG. 15 is a flowchart illustrating steps according to the image recognition method. Each step will be described in detail.

Step S1: input (conversion into binary data)

An image of a figure or the like to be recognized is input into an observation region (not shown). The observation region is represented by a matrix having N×N elements. The image input into the observation region is converted into a binary pattern based on the following rules. The binary pattern is also represented by a matrix having N×N elements, each element having either 0 or 1.

Rule 1: The elements of the matrix representing the observation region correspond to the elements of the matrix representing the binary pattern, one by one, respectively.

Rule 2: In the matrix representing the binary pattern, the element disposed at the position (i, j) is denoted as x(i, j) and a value thereof is denoted as $x_{i,j}$. The value $x_{i,j}$ is determined by Equation 7.

$$x_{i,j} = \begin{cases} 1 & \text{if } s_{ij} > 0 \\ 0 & \text{else} \end{cases} \quad \text{Equation 7}$$

where $s_{i,j}$ represents the length of a line segment of a character included in the element disposed at the position (i, j) in the matrix representing the observation region. Specifically, when the element disposed at the position (i, j) includes at least a portion of the character to be recognized, the value $x_{i,j}$ is 1. Otherwise, the value $x_{i,j}$ is 0.

The binary pattern thus obtained is input to the input layer 34 in FIG. 8. The input layer 34 is presented by a matrix having N×N elements. Each element of the matrix representing the input layer 34 corresponds to each element of the matrix representing the binary pattern one by one, and outputs an identical value with that of the corresponding element of the matrix representing the binary pattern.

Step S2: Line segment extraction

Based on the output from the input layer 34, a plurality of predetermined patterns are extracted. In this example, it is assumed that the plurality of predetermined patterns are four line segments: a vertical line segment, a horizontal line segment, a left-oblique line segment and a right-oblique line segment. Any other pattern can also be extracted.

Line segment l is defined as follows:

When line segment l:l=1, vertical line segment l=2, horizontal line segment l=3, left-oblique line segment l=4, right-oblique line segment The pattern extraction layer 35 in FIG. 8 includes line segment extraction layers 52 through 55 for extracting these four line segments. Here, the four line segment extraction layers 52 through 55 for extracting the line segments l are denoted as $U^l$ (l=1, 2, 3, 4).

Each of the line segment extraction layers $U^l$ is represented by a matrix having N×N elements. In the matrix representing the line segment extraction layer $U^l$, the element disposed at the position (i, j) is denoted as $u^l(i, j)$, and the value thereof is denoted as $u^l_{i,j}$. The value $u^l_{i,j}$ is determined by Equation 8.

$$u^l_{i,j} = \Phi\left[\sum_{(m,n)\in\Omega^l} w^l_{m,n} x_{i+m,j+n}\right] \quad \text{Equation 8}$$

where $\Phi[.]$ represents an output function, $w^l_{m,n}$ represents a weight coefficient, $\Omega^l$ represents a set of (m, n) which defines the connection between the element x(i, j) and the element $u^l(i, j)$. $\Phi[.]$, $w^l_{m,n}$, and $\Omega^l$ satisfies the relationship expressed by Equations 9 through 11, respectively.

$$\Phi[\xi] = \begin{cases} 1 & (\text{if } \xi \geq 3) \\ 0 & (\text{if } \xi < 3) \end{cases} \quad \text{Equation 9}$$

$$w^1_{m,n} = \begin{cases} 2 & (\text{if } m = n = 0) \\ 1 & (\text{else}) \end{cases} \quad \text{Equation 10}$$

$$\Omega^1 = \{(m, n)|(1, 0), (0, 0), (-1, 0)\} \quad \text{Equation 11}$$

$$\Omega^2 = \{(m, n)|(0, 1), (0, 0), (0, -1)\}$$

$$\Omega^3 = \{(m, n)|(1, -1), (0, 0), (-1, 1)\}$$

$$\Omega^4 = \{(m, n)|(1, 1), (0, 0), (-1, -1)\}$$

As is expressed by Equation 10 which defines the connection between the input layer 34 and the line segment extraction layer $U^l$, $w^l_{0,0}=2$ is optimal in order to effectively perform the line segment extraction. However, it is also possible to use a weight coefficient satisfying $w^l_{0,0}>1$ by adjusting the output function and the threshold value of the output function.

Table 1 shows the relationship between the output from the input layer 34 and the output from the line segment extraction layer $U^l$ for extracting a vertical line segment.

TABLE 1

|  | (a) |  |  | (b) |  |  |  |  |
|---|---|---|---|---|---|---|---|---|
| $1 \times \chi_{i-1,j}$ | 1 | 1 | 0 | 1 | 0 | 1 | 0 | 0 |
| $e \times \chi_{i,j}$ | e | e | e | 0 | e | 0 | 0 | 0 |
| $1 \times \chi_{i+1,j}$ | 1 | 0 | 1 | 1 | 0 | 0 | 1 | 0 |
| $\xi$ | e+2 | e+1 | e+1 | 2 | e | 1 | 1 | 0 |
| $u^l_{i,j}$ | 1 | 1 | 1 | 0 | 0 | 0 | 0 | 0 | where $w^l_{0,0}=e$ (>1). In Table 1, column (a) shows the case where the element $u^l_{i,j}$ of the line segment extraction layer $U^l$ should output "1", whereas column (b) shows the case where the element $u^l_{i,j}$ of the line segment extraction layer $U^l$ should output "0". In order to obtain such output, the output function $\Phi$ defined by Equation 12 is used instead of the output function $\Phi$ defined by Equation 9, and the threshold value $\theta$ of the output function $\Phi$ which satisfies Equation 13 is given. If the threshold value $\theta$ of the output function $\Phi$ satisfies Equation 13, when the element $u^l_{i,j}$ of the line segment extraction layer $U^l$ is to output 1, the threshold value $\theta$ is smaller than the sum $\xi$ of the input signals; and when the element $u^l_{i,j}$ is to output 0, the threshold value $\theta$ is larger than the sum $\xi$ of the input signals. Accordingly, the line segment extraction can be performed by applying the output function $\Phi$ defined by Equation 12 to the sum $\xi$ of the input signals. In the same manner, any other type of line segment can be also extracted.

$$\Phi[\xi] = \begin{cases} 1 & (\text{if } \xi \geq \theta) \\ 0 & (\text{if } \xi < \theta) \end{cases} \quad \text{Equation 12}$$

$$\begin{cases} 2 < \theta \leq e+1 & (\text{if } 1 < e < 2) \\ e < \theta \leq e+1 & (\text{if } 2 \leq e) \end{cases} \quad \text{Equation 13}$$

It is also possible to extract line segments by the use of methods other than the method described above, for example, by pattern matching. Hereinafter, a method for extracting a line segment using a mask pattern shown in FIG. 16B from an optical binary pattern shown in FIG. 16A will be described. In FIGS. 16A and 16B, a light intensity with the black portion is denoted as I, and a light intensity with the white portion is 0. The light intensity transmitted through the pattern of FIG. 16A is measured by moving the mask pattern of FIG. 16B from the top left corner of the pattern of FIG. 16A. If the measured light intensity is equal to 2I, this means that a vertical line segment exists on the pattern of FIG. 16A. Other line segments can be extracted in a same manner by use of the mask patterns shown in FIGS. 16C through 16E.

Step S3: Direction extraction

A first feature representing a direction in which a line segment l' exists with respect to each point on another line segment l is extracted based on the result of extracting four types of line segments.

There are six ways for selecting a combination of two different line segments among four types of line segments l. The direction extraction layer 36 in FIG. 8 has at least six regions for extracting positional relationship between the line segments l and l'. These six regions are denoted as $D^{l\rightarrow l'}$. For simplicity, the positional relationship of the line segment l with respect to the same line segment l is not considered here. For example, the region for extracting a feature representing a direction in which a horizontal line segment (l=2) exists with respect to a vertical line segment (l=1) is denoted as $D^{1 \to 2}$. The region for extracting a feature representing a direction in which a left-oblique line segment (l=3) exists with respect to a horizontal line segment (l=2) is denoted as $D^{2 \to 3}$.

Figure 3:
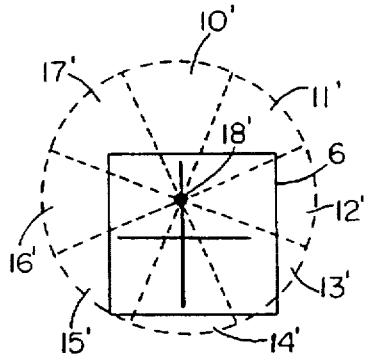
FIG. 3 is a conceptual view illustrating the positional relationship between two line segments.

The regions $D^{l \to r}$ in the direction extraction layer 36 each includes eight regions $d^{l \to r}(k)$, where k is a parameter indicating a certain direction and directions indicated by k=1 through 8 respectively correspond to the directions 10' through 17' shown in FIG. 3. For example, the region $D^{1 \to 2}$ includes eight regions $d^{1 \to 2}(k)$ (k=1 through 8).

Each of the regions $d^{l \to r}(k)$ is represented by a matrix having N×N elements. In the matrix representing the region $d^{l \to r}(k)$, the element disposed at the position (i, j) is denoted as $d^{l \to r}_k(i, j)$ and a value thereof is denoted as $d^{l \to r}_{k,i,j}$. The value $d^{l \to r}_{k,i,j}$ is defined as given by Equation 14 so as to represent a length of the line segment l' existing in the direction k with respect to the element $u^l(i, j)$ disposed on the line segment l in the line segment extraction layer $U^l$. Equation 14 defines the connection between the line segment extraction layers $U^l$ and $U^r$ and the regions $D^{l \to r}$ of the direction extraction layer 36.

$$d^{l \to r}_{k,i,j} = \sum_{(m,n) \in \Omega^k} u^l_{i,j} \cdot u^r_{i+m,j+n}$$

$$= u^l_{i,j} \cdot \left\{ \sum_p^N \sum_q^N w^k(i,j)_{p,q} \cdot u^r_{p,q} \right\}$$

Equation 14

Here, $\Omega^k$ is a set of (m, n) which defines the connection between the regions $D^{l \to r}(k)$ and the line segment extraction layers $U^l$ and $U^r$. (m, n) indicates a relative coordinate of the element existing in the direction k with respect to the $u^r(i, j)$ in the line segment extraction layer $U^r$. $w^k(i, j)_{p,q}$ indicates a weight coefficient. The coefficient $w^k(i, j)_{p,q}$ is 1 when the element $u^r$ (p, q) disposed at the position (p, q) in the line segment extraction layer $U^r$ exists in the direction k with respect to the element $u^l(i, j)$ disposed at the position (i, j), and is 0 otherwise.

The number of directions in which the line segment l' exists with respect to the line segment l is not limited to eight. For example, it is possible to define 16 directions by dividing the circle in FIG. 3 into 16. In such a case, the region $D^{l \to r}$ in the direction extraction layer 36 includes 16 regions $d^{l \to r}(k)$ according to k=1 to 16.

Step S4: Length extraction

A second feature representing a length of the line segment l' existing in the direction k with respect to the line segment l is extracted based on the first feature extracted in Step 3.

The integration layer 37 in FIG. 8 includes at least six regions. These six regions are each denoted as $R^{l \to r}$. The regions $R^{l \to r}$ each includes eight neurons $r^{l \to r}(k)$, where k is a parameter indicating a certain direction, and directions indicated by k=1 through 8 respectively correspond to the directions 10' through 17' shown in FIG. 3. For example, the region $R^{1 \to 2}$ includes eight neurons $r^{1 \to 2}(k)$ (k=1 through 8).

The neurons $r^{l \to r}(k)$ each have a value $r^{l \to r}_k$. The value $r^{l \to r}_k$ is defined as given by Equation 15 so as to represent a length of the line segment l' existing in the direction k with respect to the line segment l. Equation 15 defines the connection between the regions $D^{l \to r}$ in the direction extraction layer 36 and the regions $R^{l \to r}$ in the integration layer 37.

$$r^{l \to r}_k = \sum_i^N \sum_j^N d^{l \to r}_{k,i,j}$$

Equation 15

Alternatively, Equation 16 may be used instead of Equation 15. Equation 16 is obtained by applying the output function f to the sum shown in the right side of Equation 15. As the output function f[.], the sigmoidal function or the like is generally used. Equation 15 is an example in which a linear function (y=x) is used as the output function f of Equation 16.

$$r^{l \to r}_k = f \left[ \sum_i^N \sum_j^N d^{l \to r}_{k,i,j} \right]$$

Equation 16

Step S5: Recognition

Based on the outputs from the regions $R^{l \to r}$ in the integration layer 37, an input character is distinguished. For example, in order to distinguish 26 alphabetic characters, the output layer 38 is required to have at least 26 neurons. Each neuron in the output layer 38 is denoted as y(j), and a value thereof is denoted as $y_j$. The value $y_j$ is defined as given by Equation 17. Equation 17 defines the connection between the regions $R^{l \to r}$ in the integration layer 37 and the output layer 38.

$$y_i = f_{max}\{\delta_j\} = \begin{cases} 1 & (\text{if } \delta_j \text{ is maximum}) \\ 0 & (\text{else}) \end{cases}$$

Equation 17

Here, $\delta_j$ represents the sum of input signals from the regions $R^{l \to r}$ in the integration layer 37. $\delta_j$ is defined as given by Equation 18. $w^{l \to r}_{jk}$ represents a synapse weight. $f_{max}\{\delta_j\}$ represents an operator which compares the sums $\delta_j$ and outputs 1 for the element having the maximum sum $\delta_j$ and outputs 0 for the other elements. The synapse weight $w^{l \to r}_{jk}$ can be modified by learning. It is desirable to learn by use of the orthogonal learning method.

$$\delta_j = \sum_{l \to r} \sum_k w^{l \to r}_{jk} \cdot r^{l \to r}_k$$

Equation 18

If a process until obtaining the output of the neurons $r^{l \to r}(k)$ from an input image is considered as a preliminary process (i.e., feature extraction process) for an image recognition, the recognition section 3 can be considered as a so-called perceptron including the two layers of the integration layer 37 and the output layer 38. The image recognition is also possible by processing the outputs from the neurons $r^{l \to r}(k)$ using a hierarchical neural network including three or more layers. In this case, it is desirable to learn by use of the so-called error propagation learning method.

Next, a learning method for efficiently modifying the synapse weight $w^{l \to r}_{jk}$ will be described.

Equation 19 shows a transition of the synapse weight in the case where the learning is executed by use of the orthogonal learning method.

$$w^{l \to r}(t+1)_{jk} = w^{l \to r}(t)_{jk} + \alpha \cdot r^{l \to r}_k (t_j - y_j)$$

Equation 19

Here, $w^{l \to r}(t)_{jk}$ represents the synapse weight concerning the connection between the neurons $r^{l \to r}(k)$ in the region $R^{l \to r}$ and the neuron y(j) in the output layer 38 after the learning is executed t times. α represents a learning gain, and $t_j$ represents a target signal. The target signal is an expected value which is to be output by the neuron y(j) when an image is input.

For example, when learning for the 26 characters of the alphabet are executed, different types of characters previously prepared are sequentially learned. When all the characters are correctly recognized, the learning is completed. The times for the learning is defined in the following manner. Each time all the characters of each type are learned, the time of the learning is increased by one.

However, the learning based on Equation 19 is not efficient, namely, because it requires a large number of times of learning until all the characters are correctly recognized in the case where the characters to be learned are different in size from one another. This is attributed to the following reason. The second term of the right side of Equation 19 expresses a modification amount of the synapse weight. As is apparent from Equation 19, a modification is performed in proportion to the value $r^{l \rightarrow l'}{}_k$ for each time the learning is executed. As is described above, the value $r^{l \rightarrow l'}{}_k$ represents a length of the line segment l' existing in the direction k with respect to the line segment l in an input image. As the size of an input character is increased, the length of each line segment is also increased. As a result, the absolute value of $r^{l \rightarrow l'}{}_k$ is also increased. Since the modification amount of the synapse weight per character depends on the size of the input character, the learning efficiency is possibly declined when a plurality of characters having different sizes are to be learned.

The problem mentioned above is solved by the following method.

We have found that the learning efficiency for characters having different sizes is significantly improved by normalizing the value $r^{l \rightarrow l'}{}_k$. There are the following two methods for normalization.

(1) Normalizing the output from the neuron $r^{l \rightarrow l'}(k)$ in the region $R^{l \rightarrow l'}$ using the sum of the outputs from all the neurons $r^{l \rightarrow l'}(k)$. According to this method, the normalized value $r^{l \rightarrow l'}{}_{norm, k}$ is obtained as given by Equation 20.

$$r^{l \rightarrow l'}_{norm,k} = \frac{r^{l \rightarrow l'}_k}{\sum_{l \rightarrow l'} \sum_k r^{l \rightarrow l'}_k} \qquad \text{Equation 20}$$

(2) Normalizing the output from the neuron $r^{l \rightarrow l'}(k)$ in the region $R^{l \rightarrow l'}$ using the maximum value of the outputs from all the neurons $r^{l \rightarrow l'}(k)$. According to this method, the normalized value $r^{l \rightarrow l'}{}_{norm, k}$ is obtained as given by Equation 21.

$$r^{l \rightarrow l'}_{norm,k} = \frac{r^{l \rightarrow l'}_k}{\max\{r^{l \rightarrow l'}_k\}} \qquad \text{Equation 21}$$

Accordingly, Equation 19 may be replaced by Equation 22.

$$w^{l \rightarrow l'}(t+1)_{jk} = w^{l \rightarrow l'}(t)_{jk} + \alpha \cdot r^{l \rightarrow l'}_{norm,k}(t_j - y_j) \qquad \text{Equation 22}$$

Table 2 shows the learning efficiency when the learning is executed based on Equation 22. As is apparent from Table 2, it has been confirmed that the learning efficiency is significantly improved by using the normalized value $r^{l \rightarrow l'}{}_{norm, k}$. Thus, normalization is extremely effective for high speed learning.

TABLE 2

| Comparison of learning times | | | |
|---|---|---|---|
| | Not Normalized | Normalized using sum | Normalized using Maximum value |
| Alphabet | 90 | 35 | 34 |
| Numerical Figures | 72 | 16 | 18 |

FIGS. 17A through 17D show an example of outputs from the input layer 34, the pattern extraction layer 35, the direction extraction layer 36 and the integration layer 37, respectively, when the character "J" is input. The blank portions in FIGS. 17A through 17D indicate that the value of the element is 0. The meaning of the values indicated in the regions $D^{l \rightarrow l'}$ in the direction extraction layer 36 will be described, hereinafter. In FIG. 17C, for example, the value of the element at the position (3, 4) of the region $d^{1 \rightarrow 2}(8)$ in the region $D^{1 \rightarrow 2}$ is 2. This is because the number of the elements of the horizontal line segment existing in the direction of k(=8) (the "left above" direction) with respect to the element disposed at the position (3, 4) of the line segment layer $U^1$ is 2. In this case, the two elements are one at the position (2, 2) and one at the position (2, 3) of the line segment extraction layer $U^2$. In a similar manner, since there are two elements on the horizontal line segment existing in the direction of k(=8) (the "left above" direction) with respect to the element disposed at the position (4, 4) of the line segment extraction layer $U^1$, the value of the element disposed at the position (4, 4) of the region $d^{1 \rightarrow 2}(8)$ in the region $D^{1 \rightarrow 2}$ is 2. Since there is one element on the horizontal line segment existing in the direction of k(=8) (the "left above" direction) with respect to the element disposed at the position (5, 4) of the line segment extraction layer $U^1$, the value of the element disposed at the position (5, 4) of the region $d^{1 \rightarrow 2}(8)$ in the region $D^{1 \rightarrow 2}$ is 1. As is shown in FIG. 17D, the sum (2+2+1=5) of the values of the elements on the region $d^{1 \rightarrow 2}(8)$ in the region $D^{1 \rightarrow 2}$ appears at the position (1, 1) of the region $R^{1 \rightarrow 2}$ in the integration layer 37. This is because the region $d^{l \rightarrow l'}(k)$ is connected with the region $R^{l \rightarrow l'}$ so that the sum of the values of the elements in the region $d^{l \rightarrow l'}(k)$ is the value of the element $r^{l \rightarrow l'}(k)$.

A feature extracting optical neuron device for implementing the line segment extraction will be described.

Figure 18:
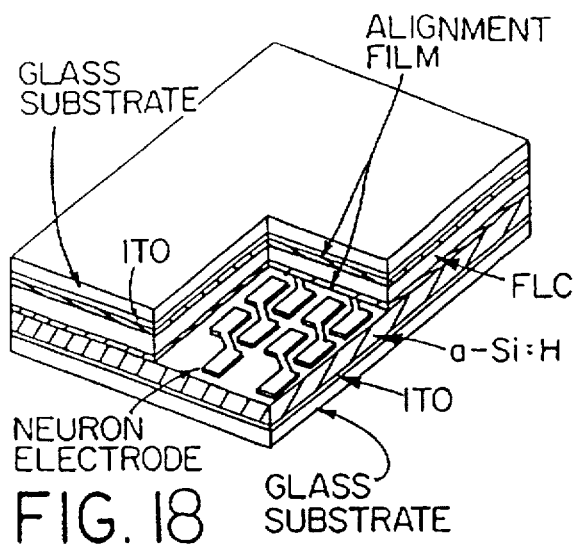
FIG. 18 is a perspective view of a feature extracting optical neuron device.

FIG. 18 shows a cross sectional view of a feature extracting optical neuron device. The device includes two glass substrates each having a transparent electrode, a photoconductive layer interposed between the glass substrates, and an optical modulation layer. A neuron electrode is provided between the photoconductive layer and the optical modulation layer. The optical modulation layer is formed of hydrogenated amorphous silicon (a-Si:H) having a thickness of approximately 1.7 μm, and the optical modulation layer is formed of a ferroelectric liquid crystal (FLC) having a cell thickness of approximately 1 μm. The neuron electrode is formed of an aluminum thin film having a thickness of approximately 50 nm.

The feature extracting optical neuron device performs optical summation and thresholding as basic operations. The basic operations will be described, hereinafter.

(1) When writing light acts on the neuron device from the side of the photoconductive layer, a photocurrent in precise proportion to the intensity of the writing light is generated in the photoconductive layer. Since the writing light generally has a two-dimensional intensity distribution, the photocurrent also has a two-dimensional intensity distribution.

(2) The generated photocurrent is collected by each neuron electrode, and the sum of the collected photocurrent is calculated. This is an execution of optical summation.

(3) When the sum of the photocurrent exceeds a specified threshold level, the state of the FLC of the optical modulation layer is switched. This is a thresholding processing. As a result, the reading light is modulated by the optical modulation layer.

Next, an operation of an optical system using the feature extracting optical neuron device will be described briefly.

The writing light has a two-dimensional strength distribution, whereas the reading light is a uniform white light emitted from a plane light source. The reading light is linearly polarized by a polarizer (not shown) and then acts on the neuron device from the side of the optical modulation layer. Then, the reading light is reflected by the neuron electrode and again transmitted through the optical modulation layer. If the state of the optical modulation layer is switched, the polarization direction of the reading light is rotated at 90°. If the state of the optical modulation layer is not switched, the polarization direction is not changed. The reading light emitted from the neuron device is transmitted through a beam splitter (not shown) and acts on an analyzer having a polarization axis perpendicular to the polarizer. As a result, only a portion of the reading light corresponding to an region where the state of the optical modulation layer is switched passes through the analyzer. Due to the high speed response of the FLC used for the optical modulation layer, 3,000 or more patterns can be processed per second.

Next, the principle for the line segment extraction performed by the feature extracting optical neuron device will be described. The shape of the neuron electrode defines an region for performing the optical summation for the writing light.

Figure 19A:
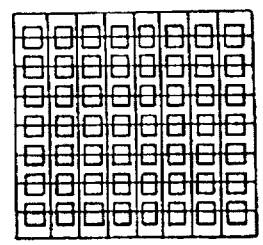
FIG. 19A is a view illustrating a pattern and arrangement of neuron electrodes for extracting a vertical line segment.
Figure 19B:
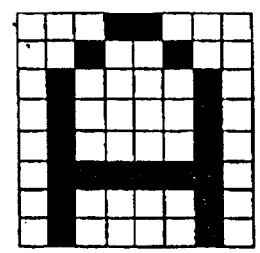
FIG. 19B is a view illustrating an example of a binary pattern converted from an input pattern.

FIG. 19A shows the shape of the neuron electrodes for extracting a vertical line segment and the arrangement thereof. Each area surrounded by dot lines corresponds to a neuron. Each neuron electrode stretches over two neurons, and the region of each neuron electrode substantially is divided into two by the neuron corresponding thereto. As is shown in FIG. 19B, the input pattern is a binary pattern having 8×8 pixels. The value of each pixel is either 0 or 1. The input pattern is input to the neuron device from the side of the photoconductive layer in such a manner that each neuron surrounded by the dot lines corresponds to each pixel. Here, the area obtained by dividing each neuron electrode into two is S, the optical intensity at the pixel in the state of "1" in the input pattern is I, and the optical intensity at the pixel in the state of "0" in the input pattern is 0. When a vertical line segment exists, two pixels vertically arranged simultaneously output "1". Accordingly, the neuron electrodes corresponding to these two pixels collect a photocurrent corresponding to an optical intensity of 2SI. When only one of these two pixels outputs "1" and the other pixel outputs "0", the neuron electrodes corresponding to these pixels only collect a photocurrent corresponding to an optical intensity of SI. Accordingly, if the optical strength I is adjusted to satisfy SI<θ<2SI with respect to the threshold level θ of the neuron device, the optical modulation layer is switched from off state to on state only when a vertical line segment exists.

Figure 19C:
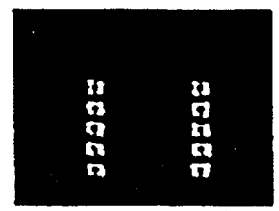
FIG. 19C is a view illustrating an experimental result of extracting a vertical line segment from the input pattern shown in FIG. 19B.

FIG. 19C shows an experimental result of extracting a vertical line segment from the input pattern shown in FIG. 19B based on the principle mentioned above.

Horizontal, left-oblique, right-oblique line segments can also be extracted based on the same principle.

Figure 20:
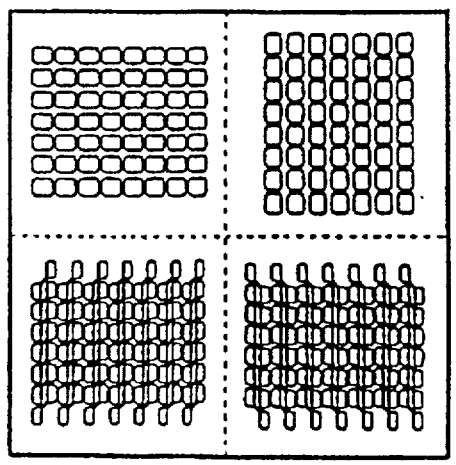
FIG. 20 is a view illustrating a feature extracting optical neuron device having four line segment extraction surfaces for extracting line segments with four directions.
Figure 21:
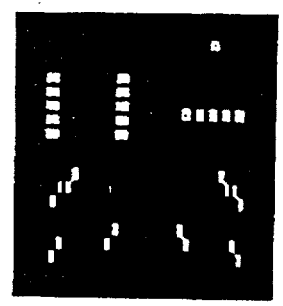
FIG. 21 is a view illustrating an example of outputs of the feature extracting optical neuron device shown in FIG. 21.

FIG. 20 shows a feature extracting optical neuron device having four line segment extraction surfaces for extracting vertical, horizontal, left-oblique, and right-oblique line segments. As is shown in FIG. 20, on the surfaces for extracting the left-oblique and the right-oblique line segments, the neuron electrode have two unit electrodes each having an area S, and these unit electrodes are connected obliquely with each other through a small electrode having a negligibly small area. In order to simultaneously and separately extract line segments in the four directions from the input pattern, one input pattern is multi-imaged into four input patterns using a lens array (not shown), and the four input patterns are respectively input to the four surfaces for extracting the line segments. FIG. 21 shows the output result obtained when the pattern shown in FIG. 19B is simultaneously input to the four surfaces. It is observed that the line segments included in the pattern "A" are extracted for each direction.

Figure 22:
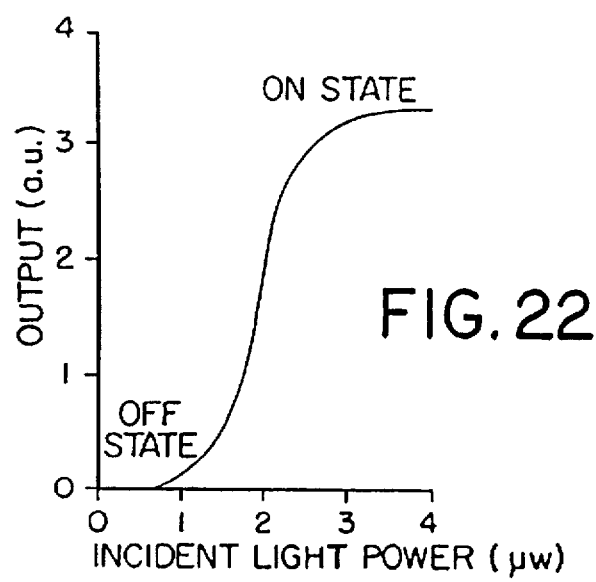
FIG. 22 is a graph showing the output characteristic of an optical neuron electrode applied with an optical signal.

FIG. 22 shows an output characteristic in a case where an optical signal is applied to one neuron electrode. As is shown in FIG. 22, when the incident light power exceeds 2 μW, the FLC used for the optical modulation layer is rapidly changed from off state to on state. This indicates that the neuron device has an output characteristic which sufficiently satisfies the condition SI<θ<2SI for the thresholding processing.

A principle of an optical system for performing the direction extraction and the length extraction will be described.

Figure 23:
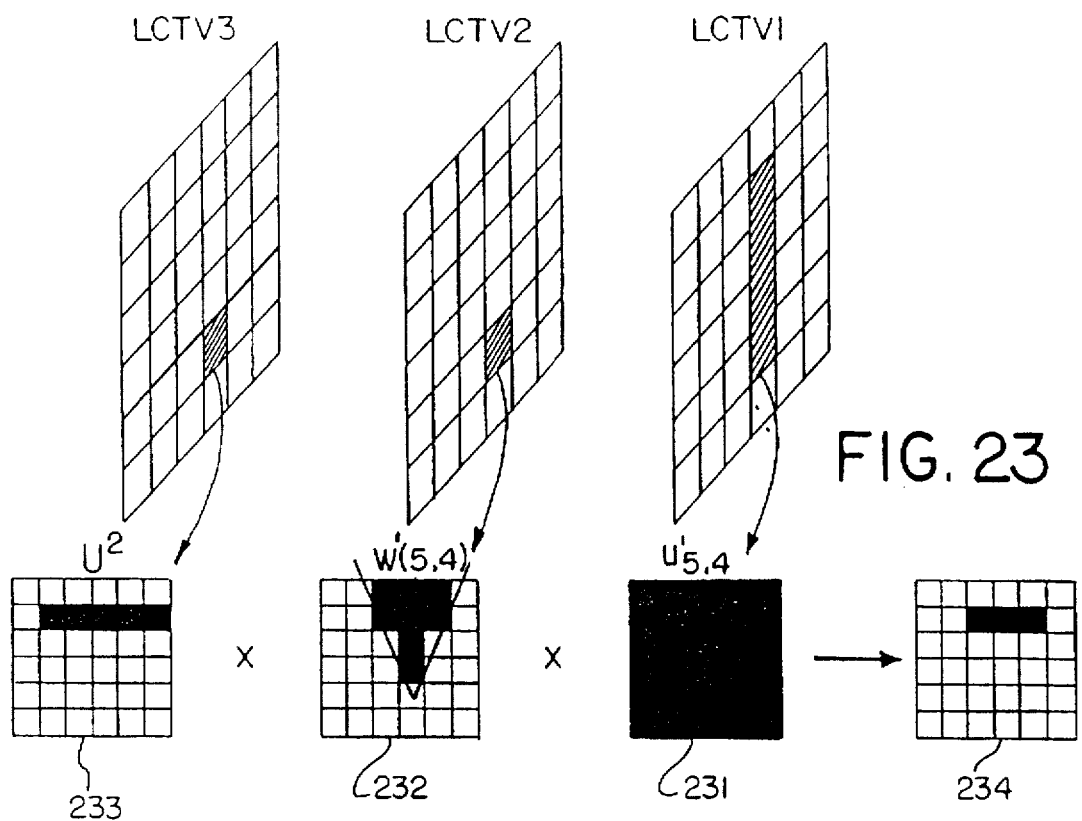
FIG. 23 is a view illustrating a configuration of an optical system for performing the direction extraction and the length extraction.

FIG. 23 shows the configuration of the optical system. The optical system includes a light source (not shown), three transparent type liquid crystal TVs (LCTV) 1 through 3, and a photoreceptor (not shown). The light emitted from the light source reaches the photoreceptor through the LCTVs 1 through 3. The LCTVs 1 through 3 have the following functions.

LCTV 1 displays the outputs from the line segment extraction layer $U^l$. LCTV 1 is represented by a matrix having N×N elements and displays the result of extracting the line segment 1 from a binary pattern.

LCTV 2 displays the coefficient $w^k(i, j)_{p,q}$ in Equation 14. LCTV 2 has N×N regions, each region being represented by a matrix having N×N elements. In other words, LCTV 2 is represented by a matrix having $N^2 \times N^2$ elements. The region disposed at the position (i, j) of the LCTV 2 corresponds to the element $u^l(i, j)$ in the line segment extraction layer $U^l$. Among the elements included in such an region, the element existing in the direction k with respect to the element disposed at the position (i, j) of the region outputs 1 and the element not existing in the direction k with respect to the element disposed at the position (i, j) of the region outputs 0.

LCTV 3 displays a multiple image of the line segment extraction layer $U^r$. LCTV 3 has N×N regions, each region being represented by a matrix having N×N elements. In other words, LCTV 3 is represented by a matrix having $N^2 \times N^2$ elements. Each region of LCTV 3 displays the output from the line segment extraction layer $U^r$. Accordingly, the entire LCTV 3 displays a pattern obtained by multi-imaging of the output from the line segment $U^r$ by N×N.

By overlapping the region disposed at the position (i, j) of the LCTV 2 and the region disposed at the position (i, j) of the LCTV 3, $w^k(i, j)_{p,q} * u^r_{p,q}$ (product of corresponding elements: Hadamard product) is obtained. Accordingly, the result of the summation of these products in each region is equal to sum of $w^k(i, j)_{p,q} * u^r_{p,q}$.

By overlapping the element disposed at the position (i, j) of the LCTV 1 and the corresponding regions in the LCTVs 2 and 3, multiplication of $u^l_{i,j}$ and $w^k(i, i)_{p,q} * u^r_{p,q}$ is executed. By summing the result obtained by overlapping the LCTVs 1 through 3 in region by region, $d^{l \to r}_{k,i,j}$ is obtained. By performing summation concerning i and j as expressed by Equation 15, $r^{l \to r}_k$ is obtained.

In order to obtain $d^{l \to r}_{k',i,j}$ and $r^{l \to r}_{k'}$ for another direction k', the coefficient displayed by the LCTV 2 is rewritten to $w^{k'}(i, i)_{p,q}$.

With reference to FIG. 23, the extraction of a horizontal line segment existing in the direction k(=1) (the "above" direction) with respect to the vertical line segment disposed at the position (5, 4) will be described below. An element 231 disposed at the position (5, 4) of the LCTV 1 outputs 1. In a region 232 disposed at the position (5, 4) of LCTV 2, elements existing in the direction k(=1) (the "above" direction) with respect to the element disposed at the position (5, 4) of the region output 1 and the other elements output 0. Each element in a region 233 disposed at the position (5, 4) of the LCTV 3 outputs the same value as the corresponding element in the line segment extraction layer U$^r$. In FIG. 23, the black portion indicates an element outputting 1, and white portion indicates an element outputting 0. By overlapping the element 231, the regions 232 and 233, a region 234 is obtained. The operation for overlapping the regions is performed so that the operation result is 1 when all of the corresponding elements are 1 and the operation result is 0 otherwise. The number of elements outputting the value 1 in the region 234 is equal to the value of $d^{1 \rightarrow 2}_{1,5,4}$. Accordingly, $d^{1 \rightarrow 2}_{1,5,4}=3$.

In the optical system mentioned above, either LCTV 1 or LCTV 3 may be an optically addressed type liquid crystal device.

In the all examples mentioned above, we show that a matrix has N×N elements, where N denotes an arbitrary natural number. However, the matrix does not require the same number of lines and columns. Specifically, the matrix may have M×N elements, where M and N denote arbitrary natural numbers and M is not equal to N.

Figure 24:
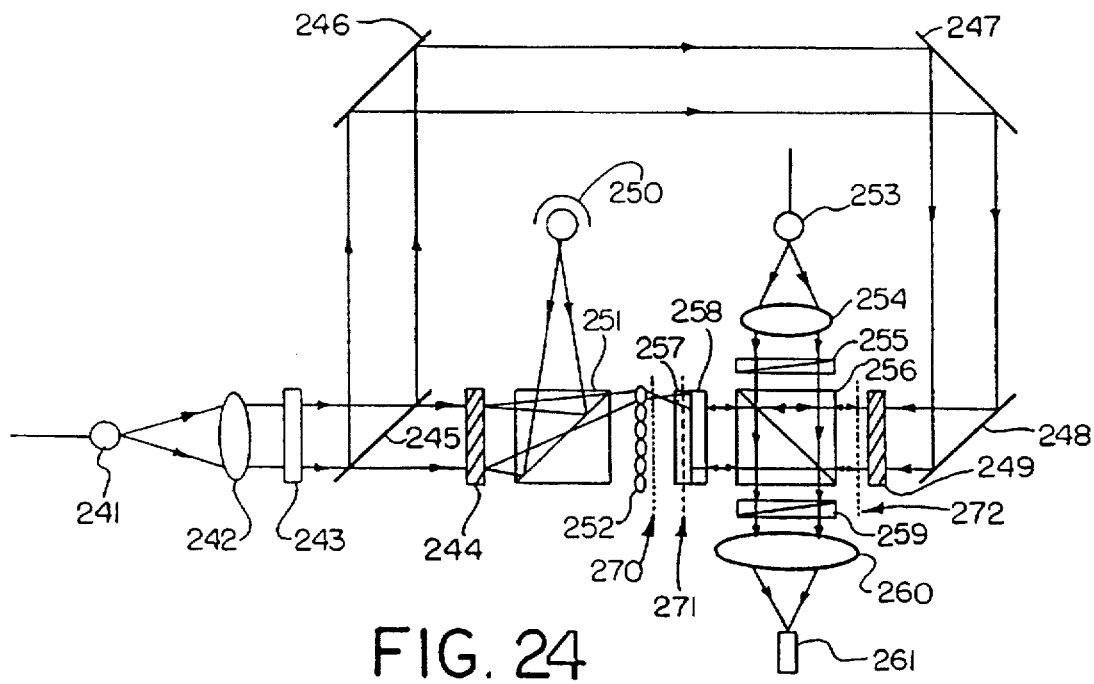
FIG. 24 is a view illustrating a configuration of an optical system for performing the line segment extraction, the direction extraction and the length extraction.

FIG. 24 shows a configuration of an optical system for performing the line segment extraction, the direction extraction and the length extraction.

Light emitted from an He—Ne laser 241 is incident upon a transparent type spatial light modulator (SLM) 243 through a lens 242. The SLM 243 displays an input binary pattern. The output from the SLM 243 is input as writing light into a feature extracting optical neuron device (FEOND) 244 for extracting a horizontal line segment from the input pattern and also is input as writing light into a feature extracting optical neuron device (FEOND) 249 through a half mirror 245 and mirrors 246 to 248. The FEOND 249 extracts a vertical line segment from the input pattern.

Light emitted from a light source 250 is incident upon FEOND 244 as reading light through a polarizing beam splitter 251. The light reflected by the FEOND 244 represents the result of extracting a horizontal line segment from the input pattern. The reflected light is incident upon a lens array 252 for multi-imaging. The multiple reflected light passes through a transparent type SLM 257, and is input into an optically addressed SLM 258 as writing light. The transparent type SLM 257 is used to define coefficients for the direction extraction.

Light emitted from an He—Ne laser 253 is incident on a polarizer 255 through a lens 254, and is linearly polarized by the polarizer 255. The light is then incident upon the FEOND 249 as reading light through a polarizing beam splitter 256. The light reflected by the FEOND 249 represents the result of extracting a vertical line segment from the input pattern. The reflected light is input as reading light into the optically addressed SLM 258. The optically addressed SLM 258 includes, for example, a dielectric mirror therein instead of the neuron electrodes of the neuron device shown in FIG. 18. The light reflected by the optically addressed SLM 258 represents the result obtained by overlapping the result of extracting the vertical line segment, the coefficients for the direction extraction and an multiple image of the result of extracting the horizontal line segment from the input pattern. The reflected light is input into an analyzer 259 having a polarizing axis perpendicular to the polarizer 255. The light passing through the analyzer 259 is detected by a photoreceptor 261 through a lens 260.

The photoreceptor 261 is connected to a computer (not shown). The computer executes the recognition process based on the detection result.

At portions 270, 271 and 272 indicated by dot lines in FIG. 24, identical patterns as those displayed on the LCTVs 3, 2 and 1 appear, respectively. Accordingly, the line segment extraction, the direction extraction, and the length extraction can be performed based on the above-mentioned principle using this optical system.

As has been described so far, according to an image recognition device and an image recognition method according to the present invention, a high recognition rate is realized with no influence by variations of characters in size and positional displacement.

Further, the neural network used in the recognition device according to the present invention is not required to learn character patterns having different sizes and different positional displacement. Accordingly, a high speed and easy learning is realized.

Still further, the device according to the present invention can detect a direction and an amount in which a specific pattern exists with respect to another specific pattern. This makes it possible to extract a feature which does not depend on the size and the displacement of the input image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A device for extracting a feature of an input image, said device comprising:

a light source for emitting a light;

first display means having M by N elements for displaying a first extracted pattern from said input image, where M and N are natural numbers;

second display means having approximately M$^2$ by N$^2$ elements for displaying a direction based pattern representing, for each of a plurality of particular elements on said first extracted pattern, a plurality of elements positioned in a specified range of direction with regard to the particular element on said first extracted pattern displayed on said first display means;

third display means having approximately M$^2$ by N$^2$ elements for displaying a multi-image pattern obtained by multiplying a second extracted pattern from said input image, said multi-image pattern consisting of multiple second extracted patterns;

detecting means for detecting a light from said third display means; and wherein said first, second and third display means are aligned so that said light emitted from said light source passes through said first, second and third display means into said detecting means.

2. The device according to claim 1, wherein said first, said second and said third display means are transparent type spatial light modulators.

3. The device according to claim 1, wherein M is equal to N.

4. The device according to claim 1, wherein M is not equal to N.

5. A device for extracting a feature of an input image, said device comprising:

first display means having M by N elements for displaying a first extracted pattern of said input image, whore M and N are natural numbers;

second display means having approximately M$^2$ by N$^2$ elements for displaying a direction based pattern representing, for each of a plurality of particular elements on said first extracted pattern, a plurality of elements positioned in a specified range of direction with regard to the particular element on said first extracted pattern displayed on said first display means;

third display means for displaying a second extracted pattern of said input image;

multiply means for multiplying said second extracted pattern so as to form multiplied second extracted patterns totaling approximately $M^2$ by $N^2$ elements;

overlapping means including a mirror for overlapping said first extracted pattern displayed on said first display means, said direction based pattern displayed on said second display means and said multiplied second extracted patterns formed by said multiply means;

detecting means for detecting a light from said overlapping means;

first directing means for directing a light to said third display means as a reading light and for directing a light reflected by said third display means to said overlapping means as a writing light through said multiply means and said second display means; and second directing means for directing a light to said first display means as a reading light, for directing a light reflected by said first display means to said overlapping means as a reading light, and for directing a light reflected by said overlapping means to said detecting means.

6. The device according to claim 5, wherein said second display means is a transparent type spatial light modulator and said first and said third display means are optically addressed spatial light modulators.

7. The device according to claim 5, wherein said overlapping means is an optically addressed spatial light modulator including a dielectric mirror.

8. The device according to claim 5, wherein M is equal to N.

9. The device according to claim 5, wherein M is not equal to N.

* * * * *